US012803202B2

(12) United States Patent
Cadoret et al.

(10) Patent No.: US 12,803,202 B2
(45) Date of Patent: Nov. 17, 2026

(54) HIGH-VOLTAGE ELECTRICAL ROTARY JOINT DEVICE CONFIGURED TO EQUIP AN ENERGY EXPLOITATION INSTALLATION

(71) Applicant: ETI GROUP, Gemenos (FR)

(72) Inventors: Yves Cadoret, Le Mans (FR); Philippe Menardo, Beaulieu-sur-Mer (FR)

(73) Assignee: ETI GROUP, Gemenos (FR)

(*) Notice: Subject to any disclaimer, the term of this patent is extended or adjusted under 35 U.S.C. 154(b) by 325 days.

(21) Appl. No.: 18/434,194

(22) Filed: Feb. 6, 2024

(65) Prior Publication Data

US 2024/0266769 A1 Aug. 8, 2024

(51) Int. Cl.

| | |
|---|---|
| ***H01R 12/88*** | (2011.01) |
| ***H01R 13/15*** | (2006.01) |
| ***H01R 13/53*** | (2006.01) |

(52) U.S. Cl.
CPC ............. *H01R 12/88* (2013.01); *H01R 13/15* (2013.01); *H01R 13/53* (2013.01)

(58) Field of Classification Search
CPC ......... H01R 12/88; H01R 13/15; H01R 13/53
See application file for complete search history.

(56) References Cited

U.S. PATENT DOCUMENTS 3,786,376 A * 1/1974 Munson .................. H01P 1/067 333/261
4,372,633 A † 2/1983 Allen
4,776,585 A * 10/1988 Maleyko .................. A63B 5/20 200/11 G
6,612,847 B2 * 9/2003 Canizales, Jr. ...... H01R 39/643 439/19
6,824,423 B1 * 11/2004 Fahl ..................... H01R 13/625 439/573

(Continued)

FOREIGN PATENT DOCUMENTS

CN 105226477 A 1/2016
CN 103151670 B 3/2016

(Continued)

OTHER PUBLICATIONS

Search Report and Written Opinion for FR Application No. 2301174 dated Jun. 26, 2023, 18 pages.

(Continued)

*Primary Examiner* — Thanh Tam T Le

(74) *Attorney, Agent, or Firm* — NIXON & VANDERHYE

(57) ABSTRACT

This relates to an electrical rotary joint device configured to equip an energy exploitation installation including a first part having an electrical connector and a first electrical track electrically connected to the first connector, a second part having a second electrical connector and a second electrical track electrically connected to the second connector, and an electrical interconnection mechanism configured to electrically interconnect the first and second electrical tracks, with the first part and the second part being movable with respect to each other and defining between them a closed internal chamber in which the first and second electrical tracks and the electrical interconnection mechanism are housed, the latter including electrical contact members that are housed, in particular prestressed, between the first and second electrical tracks and are configured to form rolling deformable contacts between the first and second electrical tracks.

18 Claims, 7 Drawing Sheets

(56) References Cited

U.S. PATENT DOCUMENTS

| | | | | |
|---|---|---|---|---|
| 6,908,310 | B1 * | 6/2005 | Olsson | H01R 39/14 439/26 |
| 8,025,506 | B2 * | 9/2011 | Cairns | H01R 39/08 439/24 |
| 8,355,607 | B2 * | 1/2013 | Zhang | G02B 6/3604 475/338 |
| 9,046,659 | B2 * | 6/2015 | Doric | G02B 6/3604 |
| 10,385,626 | B2 * | 8/2019 | Menardo | B63B 21/507 |
| 10,704,665 | B2 * | 7/2020 | Rizk | F16H 49/001 |
| 11,256,035 | B2 * | 2/2022 | Jericho | G02B 6/3604 |
| 11,345,193 | B2 * | 5/2022 | Balistreri | B60C 23/004 |
| 2022/0407273 | A1 | 12/2022 | Egger | |

FOREIGN PATENT DOCUMENTS

| | | | |
|---|---|---|---|
| WO | 03019735 | A1 † | 3/2003 |
| WO | 2010063715 | A2 | 6/2010 |
| WO | 2012059518 | A1 | 5/2012 |

OTHER PUBLICATIONS

N94-33294—"Roll Ring Assemblies for the space station" • J. Batista, J. Vise, K. Young • Published May 1, 1994 • Engineering, Physics https://www.semanticscholar.org/paper/Roll-ring-assemblies-for-the-Space-Station-Batista-Vise/f74787993b79eba96f463617e59b1a165527b32e.†

NASA Technical Memorandum 100865 Multi-Hundred Kilowatt Roll Ring Assembly Evaluation Results • David D Renz • Prepared for the 23rd Intersociety Energy Conversion Engineering Conference N88-21375 Unclas G3/31 0140268 cosponsored by the ASME, AIM, ANS, SAE, IEEE, ACS, and AlChE Denver, Colorado, Jul. 31-Aug. 5, 1988 https://ntrs.nasa.gov/api/citations/19880011991/downloads/19880011991.pdf.†

* cited by examiner
† cited by third party

HIGH-VOLTAGE ELECTRICAL ROTARY JOINT DEVICE CONFIGURED TO EQUIP AN ENERGY EXPLOITATION INSTALLATION

CROSS-REFERENCE TO RELATED APPLICATION

This application claims priority to FR Patent Application No. 2301174 filed Feb. 8, 2023, the entire contents of which are hereby incorporated by reference.

TECHNICAL FIELD OF THE INVENTION

The invention relates to electrical rotary joint devices configured to equip energy exploitation installations, of the fluidic and/or electrical type, in particular on platforms of the offshore or undersea type.

In particular, the invention relates to a high-voltage electrical rotary joint device.

The also invention relates to an energy exploitation installation, in particular fluidic and/or electrical, and for example on a platform of the offshore or undersea type, including at least one such electrical rotary joint device.

PRIOR ART

Rotary joint devices configured to equip energy exploitation installations in the maritime field can be installed on vessels, structures for producing and/or distributing fluidic and/or electrical energy, and/or for fluidic and/or electrical connection.

One example of such an installation relates to petroleum production, and in particular the exploitation of hydrocarbon fields at sea.

Floating production, storage, processing and offloading units may be formed by a vessel that is mobile, because of its environment, around a mooring turret that is geostationary. The vessel may be temporarily moored to the turret.

The installations may include pipes and cables that form a subaquatic network and that allow energy, fluidic and/or electrical communication for energy transfer between the seabed and the vessel.

Such electrical rotary joint devices can form part of a rotary joint assembly furthermore including a stack of fluidtight rotary joint devices ("swivel stack device"), the electrical rotary joint device being able to be interposed between the fluidtight rotary joint devices.

Such electrical rotary joint devices, also referred to as rotary electrical collectors or, in English terminology, "electrical swivel devices", are electromechanical devices configured to transfer electrical energy for example between the floating unit, in particular the vessel, which is mobile, and the mooring turret, which is fixed.

To ensure fluidtightness and the transfer of electrical energy between the floating unit and the turret, the electrical rotary joint devices are provided with a first part, referred to as fixed, secured to the turret, and a second part, referred to as movable, secured to the vessel. The second part of the electrical rotary joint devices is therefore movable with respect to the first part of the electrical rotary joint devices.

Electrical rotary joint devices have an internal chamber delimited by the first and second parts. This internal chamber is overall closed and fluidtight.

For example, the electrical rotary joint devices may be provided with several dynamic fluidtight members, referred to as dynamic seals, disposed in spaces formed between the first fixed part and the second movable part of the electrical rotary joint devices.

Such dynamic fluidtight members may include for example lips the function of which is to provide a seal facing the fluid.

From the patents EP 3 379 660 and EP 3 736 919, electrical rotary joint devices are in particular known that operate with circular conductive tracks that are mounted on one of the first fixed part and second movable part, in the internal chamber, and which cooperate with friction blocks that are mounted on the other one of the second movable part and first fixed part, in the internal chamber, in order to establish electrical connections, in particular in several electrical phases.

In such a so-called offshore application, the so-called high-voltage electrical rotary joint devices can for example be configured to pass voltages of the order of or greater than 1500 V DC or 1000 V AC, making it possible to transfer high electrical power between a fixed structure connected to the seabed (subsea equipment) and a mobile part such as a floating production, storage and offloading vessel (abbreviated to FPSO vessel).

The electrical rotary joint devices that are used in such applications must comply with predetermined quality requirements to offer a certain level of safety, in particular in a potentially explosive atmosphere.

For these purposes, the internal chamber of the electrical rotary joint devices may contain in particular a dielectric fluid.

In the document EP 3 379 660, provision is made for the dielectric fluid to be a dielectric insulating gas having dielectric strength greater to that of the air surrounding the electrical rotary joint device.

In the document EP 3 736 919, a system is provided for generating and injecting a dielectric fluid mist into the internal chamber, and a system for recovering and re-injecting the dielectric medium formed by the dielectric fluid and dielectric fluid mist in the internal chamber.

These solutions make it possible in particular to insulate the conductive trucks in order for example to avoid the formation of electrical arcs with adjacent conductive parts (in general metal parts), optionally to reduce the distance between the conductive tracks, or even to clean the internal chamber.

DESCRIPTION OF THE INVENTION

The invention aims to provide an electrical rotary joint device, in particular high voltage, configured to equip an energy exploitation installation, in particular fluidic and/or electrical, having performances that are further improved compared with the devices of the aforementioned prior art, while being simple, convenient and economical.

The object of the invention is thus, according to a first aspect, an electrical rotary joint device, in particular high voltage, configured to equip an energy exploitation installation, in particular fluidic and/or electrical, for example on an offshore platform, including a first part having a least one first electrical connector and at least one first electrical track electrically connected to the first electrical connector, a second part having at least one second electrical connector and at least one second electrical track electrically connected to the second electrical connector, and an electrical interconnection mechanism configured to electrically interconnect the first electrical track and the second electrical track with the first part and the second part being movable with respect to each other and defining between them a closed internal chamber in which the first electrical track, the second electrical track and the electrical interconnection mechanism are housed; characterised in that the electrical interconnection mechanism includes a plurality of electrical contact members that are housed, in particular prestressed, between the first electrical track and the second electrical track and are configured to form rolling deformable contacts between the first electrical track and the second electrical track.

In the electrical rotary joint device according to the invention, the electrical interconnection between the first electrical track and the second electrical track is made by means of the rolling deformable electrical contact members.

Thus, in the electrical rotary joint device, it is possible to dispense with the friction blocks of the solutions of the prior art.

The fact that the electrical contact members are deformable allows prestressed assembly, i.e. in permanent deformation, of these electrical contact members, which ensures permanent mechanical contact between the first electrical track, the second electrical track and the electrical contact members.

Furthermore, the fact that the electrical contact members are rolling makes it possible to ensure permanent mechanical contact, and this despite the rotation of the first and second parts with respect to each other and therefore of the first and second electrical tracks.

In other words, the electrical continuity between the first electrical track and the second electrical track is also provided through the electrical contact members, while avoiding wear thereof by rubbing and therefore favouring longevity of the electrical interconnection mechanism.

It should be noted that it is the combination of the prestressing, or in other words of the permanent deformation, and of the rotation movement of the first and second electrical tracks with respect to each other that causes the deformation of the electrical contact members, thus forming a larger contact surface between the electrical contact members and these first and second electrical tracks.

Particularly simple, convenient and economical preferred features of the device according to the invention are presented below.

The electrical contact members each have an internal face and an internal housing delimited by the internal face, and the electrical interconnection mechanism includes a plurality of conductive elastic members that are disposed in a respective internal housing and pressed against a respective internal face.

Such conductive elastic members are configured to fit to the respective internal face of the electrical contact members despite the deformation of the latter due to the prestressing and to the movement of the first and second electrical tracks.

Adding such conductive elastic members pressed against the respective internal face of the electrical contact members makes it possible to thicken, in cross section, these electrical contact members without reducing the deformability thereof.

In other words, these conductive elastic members make it possible to increase the cross section of flow of the electrical energy without making the electrical contact members more rigid.

The electrical rotary joint device thus offers the possibility of transferring electrical energy not only at high voltage but also at high current intensity.

The conductive elastic members can be formed by spiral springs.

The conductive elastic members can have a contact face applied to the respective internal face of the electrical contact members.

The electrical contact members are formed by cylindrical or frustoconical tubular portions.

The electrical contact members are disposed at a distance from each other between and along the first electrical track and the second electrical track.

The electrical interconnection mechanism includes a support member on which the electrical contact members, able to rotate, are disposed.

The support member is in the form of a chain provided with links each including at least one electrical contact member.

The support member includes lower elements and upper elements disposed facing each other and mechanically connected, each of the lower elements overlapping at least one other of the lower elements and each of the upper elements overlapping at least one other of the upper elements, thus forming the links.

Each link has, between the lower elements and the upper elements that overlap, at least one space receiving an electrical contact member.

Each link has at least one spacing stud disposed between two successive reception spaces.

The links and the electrical contact members are arranged so that the electrical contact members project laterally from the links to provide the contact with the first electrical track and the second electrical track.

The first electrical track and the second electrical track have, in cross section, an L shape and are disposed in opposite orientations so as to form an internal space in which the electrical contact members are disposed.

The at least one first electrical contact, and respectively the at least one second electrical contact, can have a rake shape including a main body from which there project, from a first side turned towards the first electrical track, and respectively towards the second electrical track, a plurality of secondary connection pins connected to the first electrical track, and respectively to the second electrical track, and from which a main connection pin projects on a second side opposite to the first side.

Another object of the invention, according to a second aspect, is an energy exploitation installation, in particular fluidic and/or electrical, including at least one electrical rotary joint device as described above, with the first part of the rotary joint device being attached to a fixed unit of the installation and the second part of the rotary joint device being fastened to a movable unit of the installation.

The fixed unit can for example be a mooring turret and the floating unit can for example be a vessel, a wind turbine, or a concentrator of the hub type in English terminology.

BRIEF DESCRIPTION OF THE FIGURES

The invention, according to an example embodiment, will be well understood and the advantages thereof will appear best from a reading of the detailed description that follows, given by way of indication and in no way limitatively, with reference to the accompanying drawings.

DETAILED DESCRIPTION OF THE INVENTION

Figure 1:
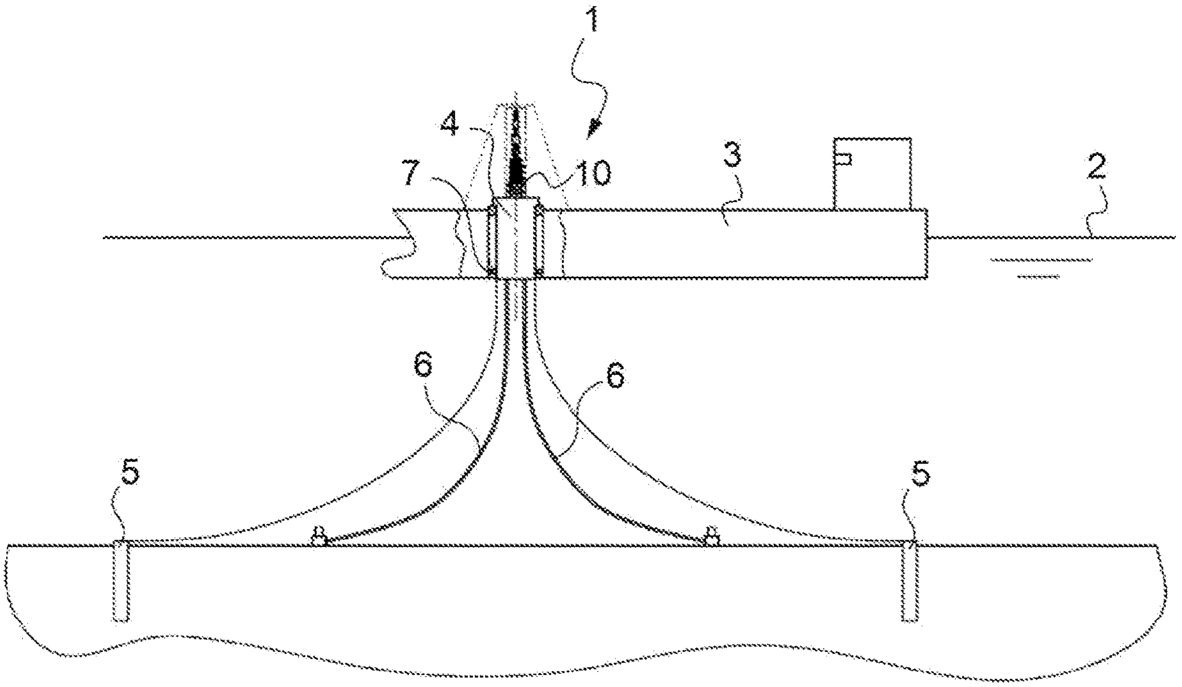
FIG. 1 shows schematically and partially an energy exploitation installation on an offshore platform, provided with a vessel, a mooring turret, a network of subaquatic pipes and cables affording communication for transferring fluids and/or energy between the turret and the vessel, and a rotary joint assembly including a stack of at least one fluidtight rotary joint device designed to provide fluidtightness between the vessel and the turret and integrity of the fluid transfer, and at least one electrical rotary joint device provided for conveying electrical energy between the vessel and the turret.

FIG. 1 illustrates an energy-exploitation installation 1, in particular here of fluids, on an offshore platform, allowing for example the exploitation of offshore hydrocarbon fields 2.

In a variant, it could for example be an installation exploiting electrical energy for exploiting wind-turbine fields.

The installation 1, also referred to as a floating production, storage and offloading unit, can be provided with a mobile unit such as a vessel 3 that is mobile because of its environment formed by the sea 2, and a fixed unit such as a mooring turret 4 that is geostationary and around which the vessel 3 is able to move.

The mooring turret 4 can for example be mechanically connected to the seabed 2 via undersea anchors 5.

The vessel 3 can be mobile with respect to the mooring turret 4 by means of a bearing mechanism 7.

The installation 1 can be provided with pipes 6 that form a network of subaquatic pipes providing fluidic communication for transferring fluid between the mooring turret 4 and the vessel 3.

The installation 1 includes a rotary joint assembly providing fluidtightness between the vessel 3 and the mooring turret 4 and therefore integrity of the fluid transfer, via a stack in particular of fluidtight rotary joint devices.

This rotary joint assembly also provides transfer of electrical energy between the vessel 3 and the mooring turret 4, via at least one electrical rotary joint device 10 installed in the stack of fluidtight rotary joint devices.

The at least one electrical rotary joint device 10 can be interposed between fluidtight rotary joint devices, or superimposed thereon, or even arranged concentrically with at least one of these fluidtight rotary joint devices and/or with at least one other electrical rotary joint device.

Figure 2:
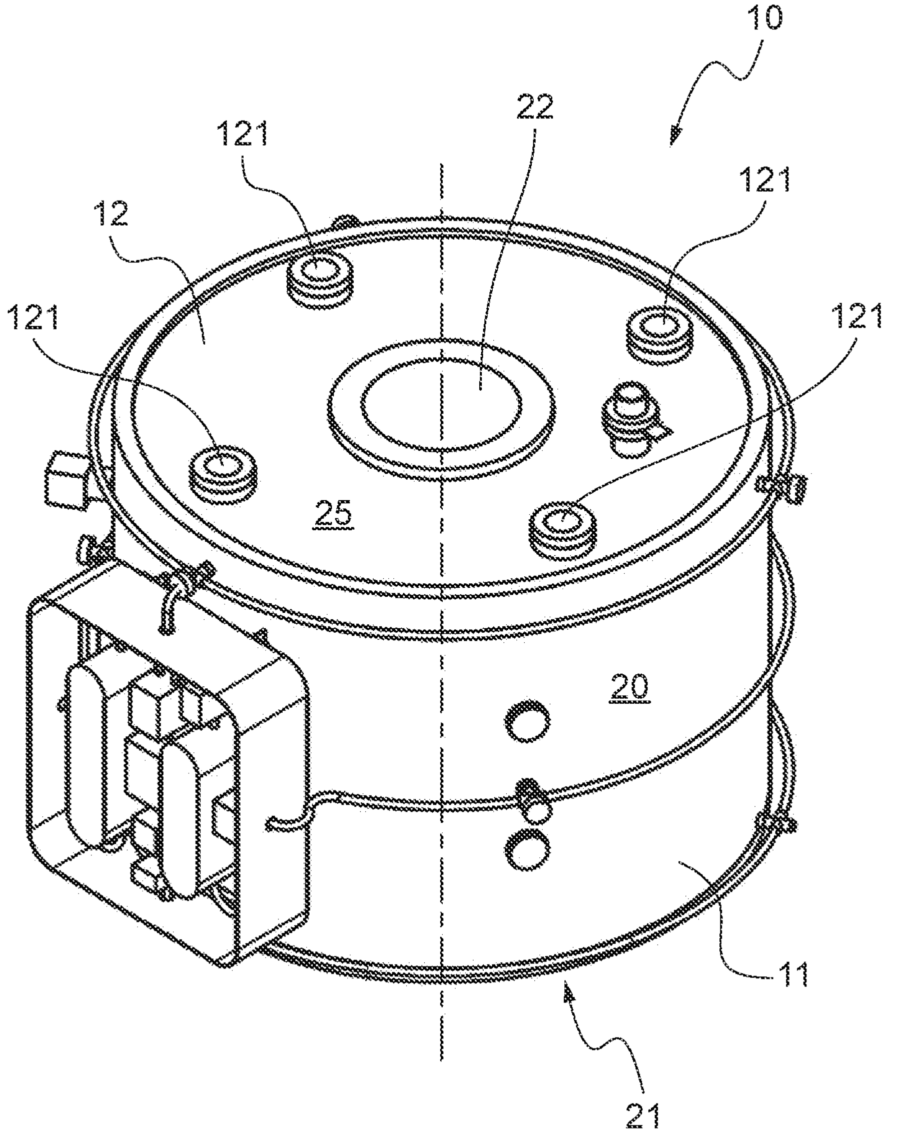
FIG. 2 shows schematically in perspective, at a viewing angle, the electrical rotary joint device of the installation illustrated on FIG. 1.
Figure 3:
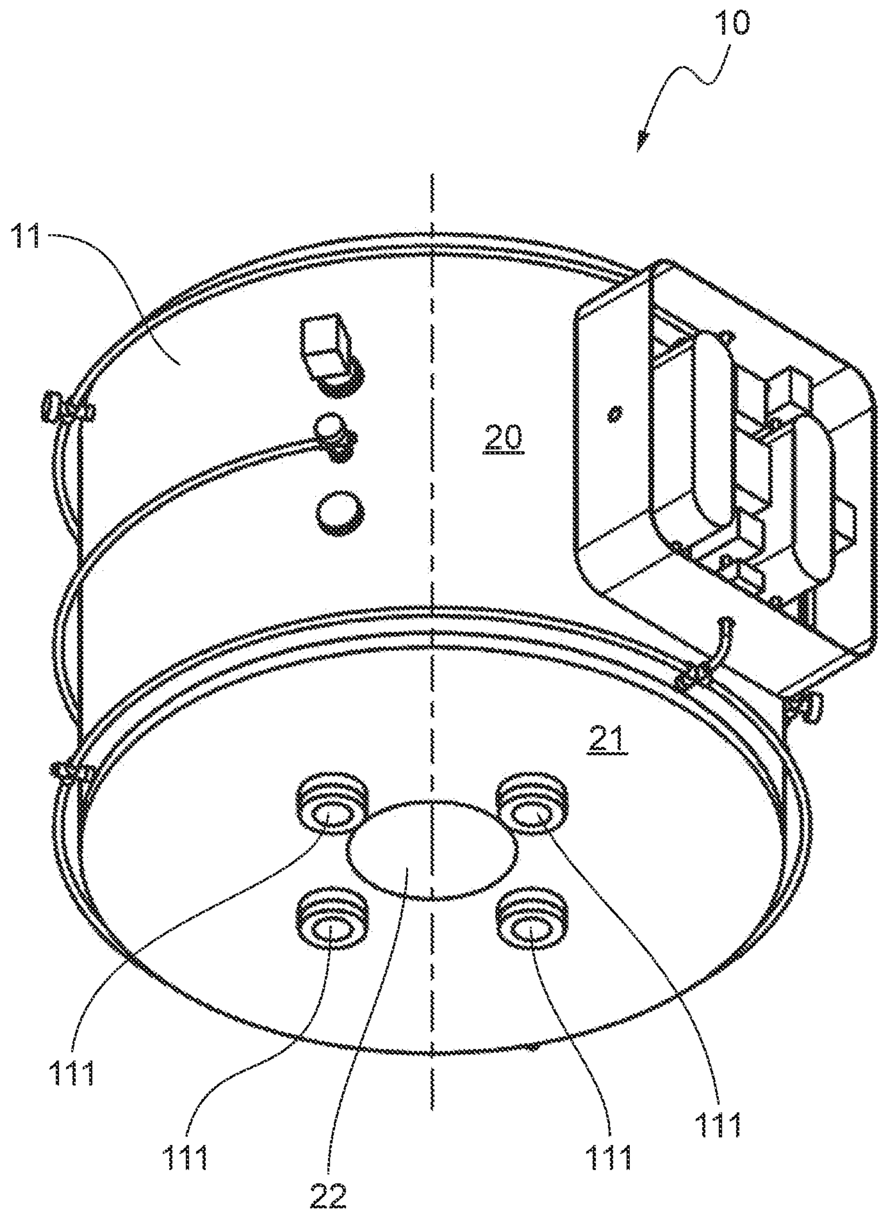
FIG. 3 is a view similar to that in FIG. 2 taken at a different viewing angle.

FIGS. 2 and 3 show such an electrical rotary joint device 10, which is roughly cylindrical and includes a first part 11, here fixed, which is configured to be attached to the mooring turret 4, and a second part 12, here movable, which is configured to be attached to the vessel 3.

In the example illustrated, the second part 12 can rotate with respect to the first part 11, by means of a rolling-bearing member or bearing (not shown) at least partially interposed between the first and second parts 11 and 12.

The first and second parts 11 and 12 are here are arranged substantially concentrically.

The first part 11 can be provided with a cylindrical external wall 20, with a bottom wall 21 connected to a lower end of the cylindrical external wall 20, and with a central barrel 22 extending from the bottom wall 21, inside the cylindrical external wall 20.

The electrical rotary joint device 10 includes electrical connection elements that are mounted projecting from the bottom wall 21 and extend around the central barrel 22.

The second part 12 can be provided with a top wall 25 having a central opening from which in particular other electrical connection elements project on either side of the top wall 25.

In the example illustrated, the first part 11 and the second part 12 are assembled so that the top wall 25 is inside the cylindrical external wall 20 of the first part 11, substantially flush with an upper end of the cylindrical external wall 20 opposite to its lower end, and with the central opening of the second part 11 being located around the central barrel 22 of the first part 11.

The electrical rotary joint device 10 is provided with fluidtight members (not shown) that are housed between the first and second parts 11 and 12 and that provide a dynamic seal between them.

Figure 4:
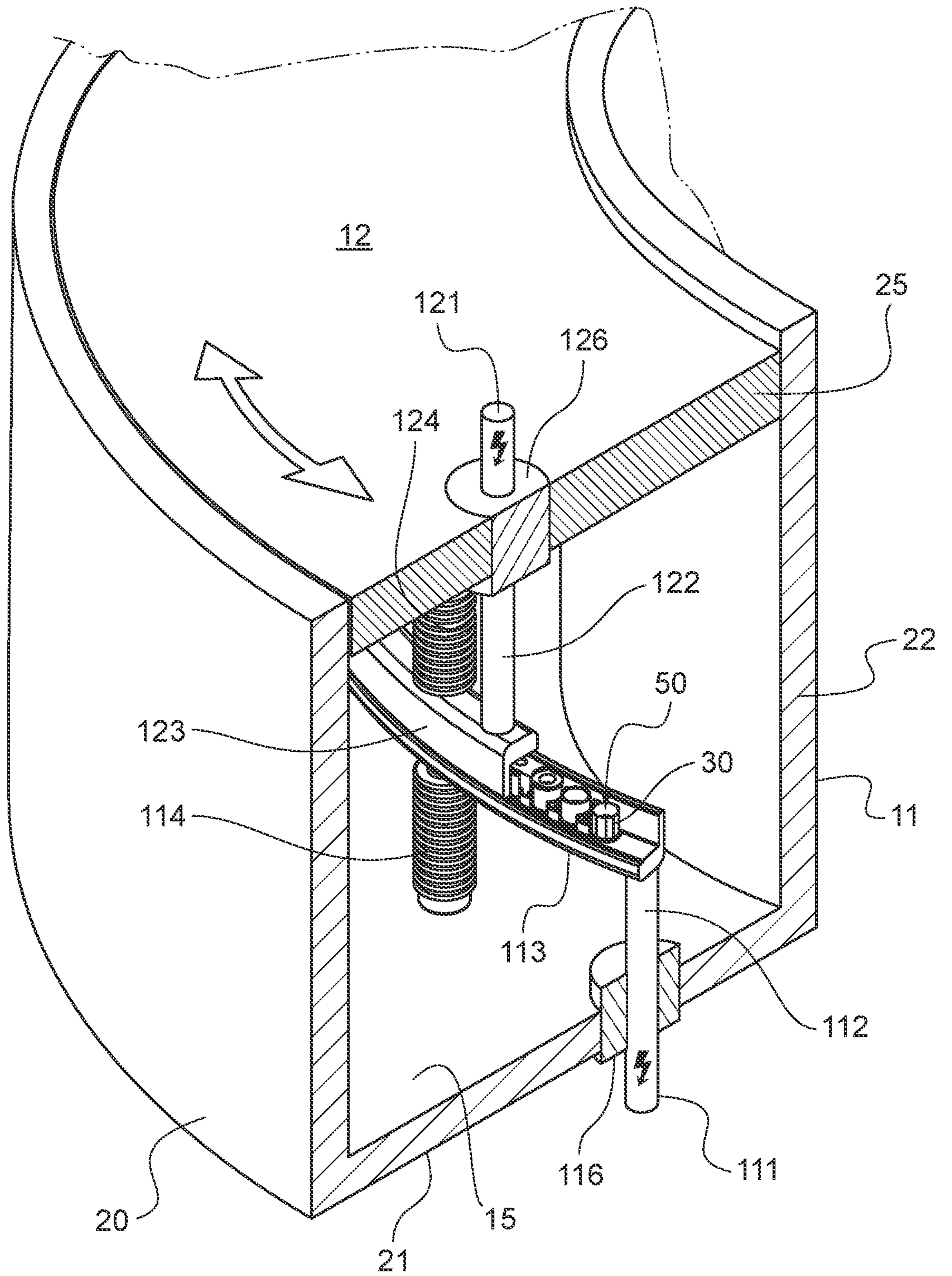
FIG. 4 shows schematically and partially the interior of the electrical rotary joint device visible on FIGS. 2 and 3.

Still with reference to FIGS. 2 and 3, and also to FIG. 4, the electrical rotary joint device 10 is provided with an internal chamber delimited by the assembly of the first part 11 and second part 12.

This internal chamber 15 is here closed and fluidtight.

In an example embodiment, the internal chamber 15 can include a dielectric medium, which may be under pressure.

Such a dielectric medium can include a mixture of dielectric liquid and/or dielectric gas, with optionally a dielectric-fluid mist.

The internal chamber 15 can furthermore include an inert gas.

In a variant embodiment, the internal chamber has no such dielectric medium.

As indicated above, electrical connection elements are disposed on the first part 11 and second part 12.

These electrical connection elements are formed by a plurality of first electrical connectors 111 that pass through the first connector supports 116 housed in the bottom wall 21 of the first part 11, and which emerge on either side of the connector support 116 outside and inside the internal chamber 15.

These electrical connection elements are also formed by a plurality of second electrical connectors 121 that pass through second connector supports 126 housed in the top wall 25 of the second part 12, and which emerge on either side of the connector support 126 outside and inside the internal chamber 15.

The electrical connection elements are furthermore formed by at least one pair of electrically conductive tracks, including a first electrical track 113 and a second electrical track 123 that are housed in the internal chamber 15.

The first and second electrical tracks 113 and 123 are here mechanically connected respectively to the first part 11 and to the second part 12 by means of electrical insulation members 114, 124, for example in the form of a strut, and which firstly carry the first and second electrical tracks 113 and 123 and secondly are themselves mechanically connected respectively to the first part 11 and to the second part 12.

On FIG. 4, a single pair of electrical tracks is illustrated but the electrical rotary joint device can include a plurality of pairs of tracks, arranged juxtaposed and/or superimposed and/or concentrically.

In the example illustrated, the first electrical track 113 is electrically connected to a first connector 111 via an internal portion 112 of the latter, while the second electrical track 123 is electrically connected to a second connector 121 via an internal portion 122 of the latter.

The first electrical track 113 and the second electrical track 123 each extend in the internal chamber 15 in a revolution.

The first electrical track 113 and the second electrical track 123 have, in cross section, an L shape and are disposed in opposite orientations in the internal chamber 15.

Thus an internal space is formed between the first electrical track 113 and the second electrical track 123, this internal space being closed overall by respective arms of the Ls (see below in more detail).

The electrical rotary joint device 10 furthermore includes an electrical interconnection mechanism 50 housed in the internal chamber 15 and configured to electrically interconnect the first electrical track 113 and the second electrical track 123.

In particular, the electrical interconnection mechanism 50 includes a plurality of electrical contact members 30 that are configured to be housed prestressed between the first electrical track 113 and the second electrical track 123.

In other words, the electrical contact members 30 are housed in the internal space formed between the first electrical track 113 and the second electrical track 123.

These electrical contact members 30 are configured to form rolling deformable contacts between the first electrical track 113 and the second electrical track 123.

Figure 5:
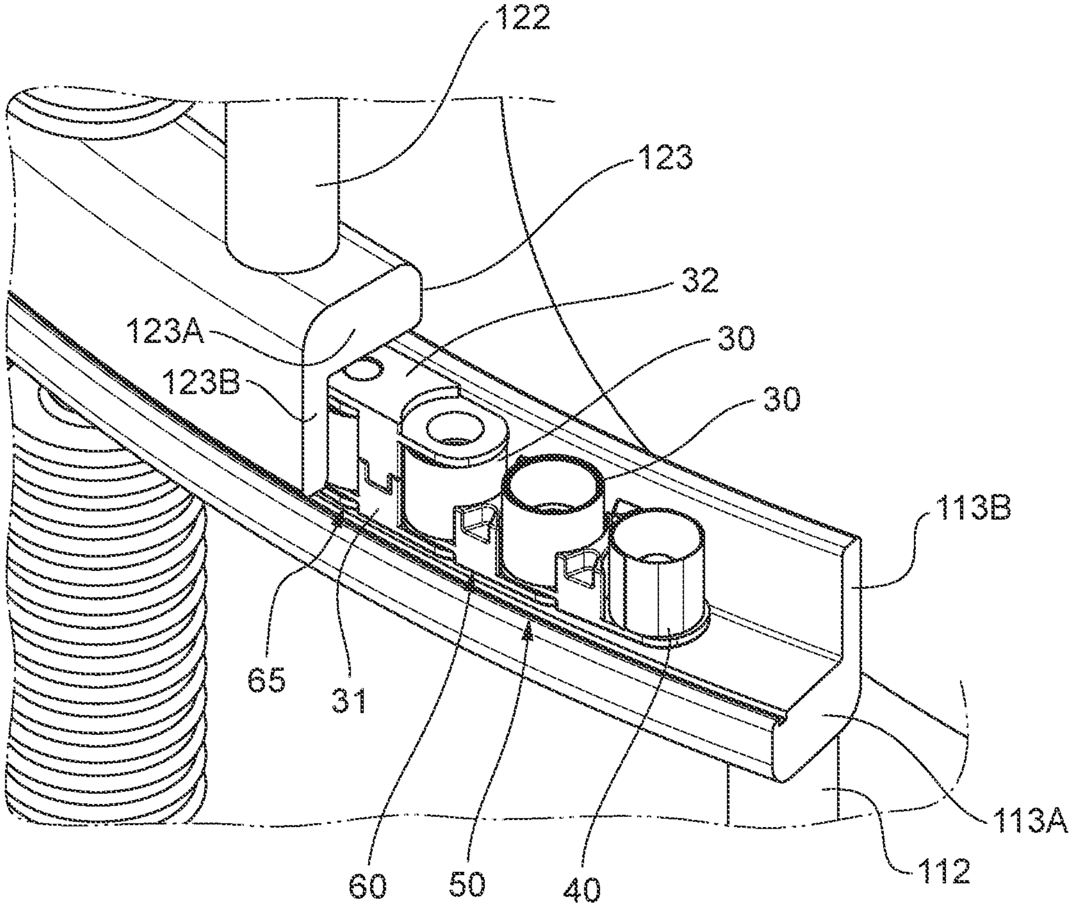
FIG. 5 is a detail view of FIG. 4, showing in particular an electrical interconnection mechanism configured to electrically interconnect a first electrical track and a second electrical track of the electrical rotary joint device.
Figure 6:
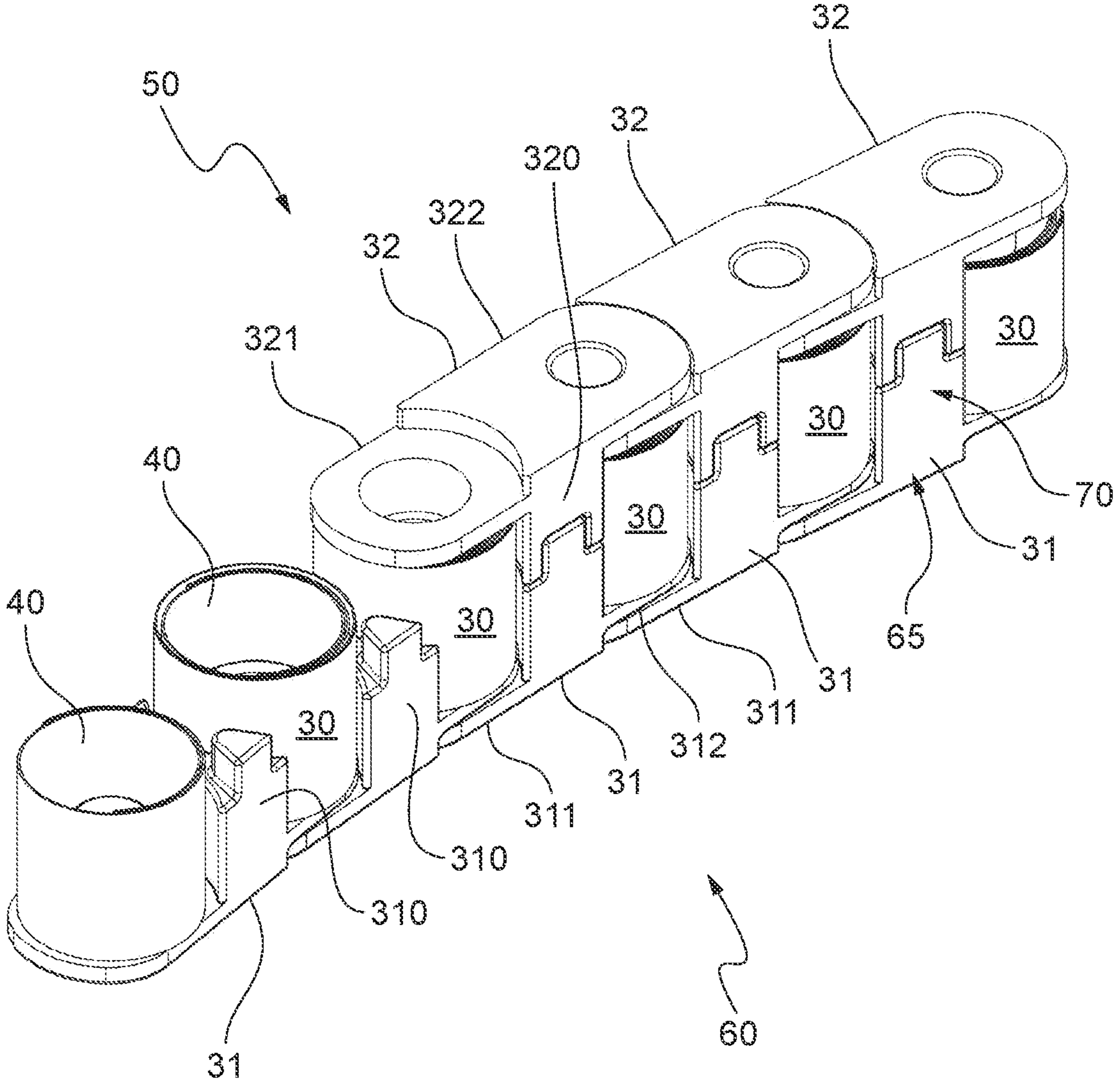
FIG. 6 is a view in isolated perspective of a portion of the electrical interconnection mechanism.

With reference now to FIGS. 5 and 6, the first electrical track 113 is fixed and has a first branch 113A connected to the internal portion 112 of the first electrical connector and a second branch 113B extending substantially perpendicularly to the first branch 113A, in the direction of the second electrical track 123.

The second electrical track 123 is here movable with respect to the first electrical track 113 and has a first branch 123A connected to the internal portion 122 of the second electrical connector 121 and a second branch 123B extending substantially perpendicularly to the first branch 123A, in the direction of the first electrical track 113.

The first electrical track and the second electrical track can be provided, at free ends of the first and second branches that are located respectively facing each other, with complementary engagement elements, for example a lip and a groove in which the lip is received, to provide the positioning of the first electrical track and of the second electrical track with respect to each other and thus to have a relatively constant internal space along the first and second electrical tracks.

The electrical contact members 30, and more generally the electrical interconnection mechanism 50, are housed in this internal space so as to be prestressed between the second branches 113B and 123B of the first and second electrical tracks 113 and 123.

The electrical contact members 30 are here formed by cylindrical tubular portions.

The electrical contact members 30 each have an external face through which they are in contact with the first and second electrical tracks 113 and 123, an internal face opposite to the external face and an internal housing delimited by the internal face.

The electrical interconnection mechanism 50 includes a plurality of conductive elastic members 40 that are disposed in the respective internal housing and pressed against the respective internal face of the respective electrical contact members 30.

The conductive elastic members 40 are here formed by spiral springs, and in particular of the foil type, having a contact face, for example planar, that is applied to the respective internal face of the electrical contact members 30.

The electrical contact members 30 are configured so that they deform under the combined action of the prestressing and of the relative movement of the first and second electrical tracks 113 and 123.

The electrical contact members 30 have a circular cross-section in the absence of stress, this cross-section being able to become substantially elliptical once the electrical contact members 30 are deformed between the first and second electrical tracks 113 and 123.

Such a deformation of the electrical contact members 30 also causes a deformation of the conductive elastic members 40, which results in an unwinding of the turns of the springs, the turns moving with respect to each other, in order to remain applied against the internal face of the electrical contact members 30.

In other words, the spiral springs unwind to remain in close contact with the interior of the cylindrical tubular portions.

The electrical contact members 30 are here disposed at a distance from each other between and along the first electrical track 113 and the second electrical track 123.

The electrical interconnection mechanism 50 includes a support member 60 on which the electrical contact members 30, able to rotate, are disposed.

In particular, in the example illustrated, the support member 60 is in the form of a chain provided with links 65 each including at least one electrical contact member 30.

The support member 60, more clearly visible on FIG. 6, includes lower elements 31 and upper elements 32 disposed facing each other and mechanically connected to each other.

Each of the lower members 31 overlaps at least one other of the lower members 31 and each of the upper elements 32 overlaps at least one other of the upper elements 32, thus forming the links 65.

Each link 65 has, between the lower elements 31 and the upper elements 32 that overlap, at least one space receiving an electrical contact member 30.

Each link 65 has at least one spacing stud 70 disposed between two successive reception spaces.

The lower elements 31 and the upper elements 32 are assembled at the spacing studs 70, through the cooperation of a male piece 310 and a female piece 320 that they include respectively.

In particular, in the example illustrated, the lower elements 31 and the upper elements 32 are each provided respectively with a first end plate respectively 311 and 321, with a second end plate respectively 312 and 322, and with a male or female piece respectively 310 and 320, disposed between the first end plate and the second end plate.

The first and second end plates 311, 321, 312 and 322 are designed to support and hold the electrical contact members 30 in the internal spaces formed in the links 65.

The overlapping of the lower elements 31 and of the upper elements 32 takes place at the first and second end plates 311, 321, 312 and 322, with in particular the first end plate of a lower element overlapping the second end plate of another adjacent lower element, and with the first end plate of the upper element facing the same lower element overlapping the second end plate of another upper element facing the same other lower element.

The links 65 and the electrical contact members 30 are arranged so that the electrical contact members 30 project laterally from the links 65 to provide the contact with the first electrical track 113 and the second electrical track 123.

In the electrical rotary joint device 10 described above, the electrical interconnection between the first electrical track 113 and the second electrical track 123 is made by means of the rolling deformable electrical contact members 30.

The fact that the electrical contact members 30 are deformable allows prestressed assembly, or in other words under permanent deformation, of these electrical contact members 30, which ensures permanent mechanical contact between the first electrical track 113, the second electrical track 123 and the electrical contact members 30.

Furthermore, the fact that the electrical contact members 30 are rolling makes it possible to ensure permanent mechanical contact, and this despite the rotation of the first and second parts 11, 12 with respect to each other and therefore of the first and second electrical tracks 113, 123.

In other words, the electrical continuity between the first electrical track 113 and the second electrical track 123 is also provided through the electrical contact members 30, while avoiding wear thereof by rubbing and therefore favouring longevity of the electrical interconnection mechanism 50.

It should be noted that it is the combination of the prestressing and of the rotation movement of the first and second electrical tracks 113, 123 with respect to each other that causes the deformation of the electrical contact members 30, thus forming a larger contact surface between the electrical contact members 30 and these first and second electrical tracks 113, 123.

It should also be noted that the conductive elastic members 40 are configured to fit to the respective internal face of the electrical contact members 30 despite the deformation of the latter due to the prestressing and to the movement of the first and second electrical tracks 113, 123.

Adding such conductive elastic members 40 pressed against the respective internal face of the electrical contact members 30 makes it possible to thicken, in cross section, these electrical contact members 30 without reducing the deformability thereof.

In other words, these conductive elastic members 40 make it possible to increase the cross section of flow of the electrical energy without making the electrical contact members 30 more rigid.

The electrical rotary joint device 10 thus offers the possibility of transferring electrical energy not only at high voltage but also at high current intensity.

Figure 7:
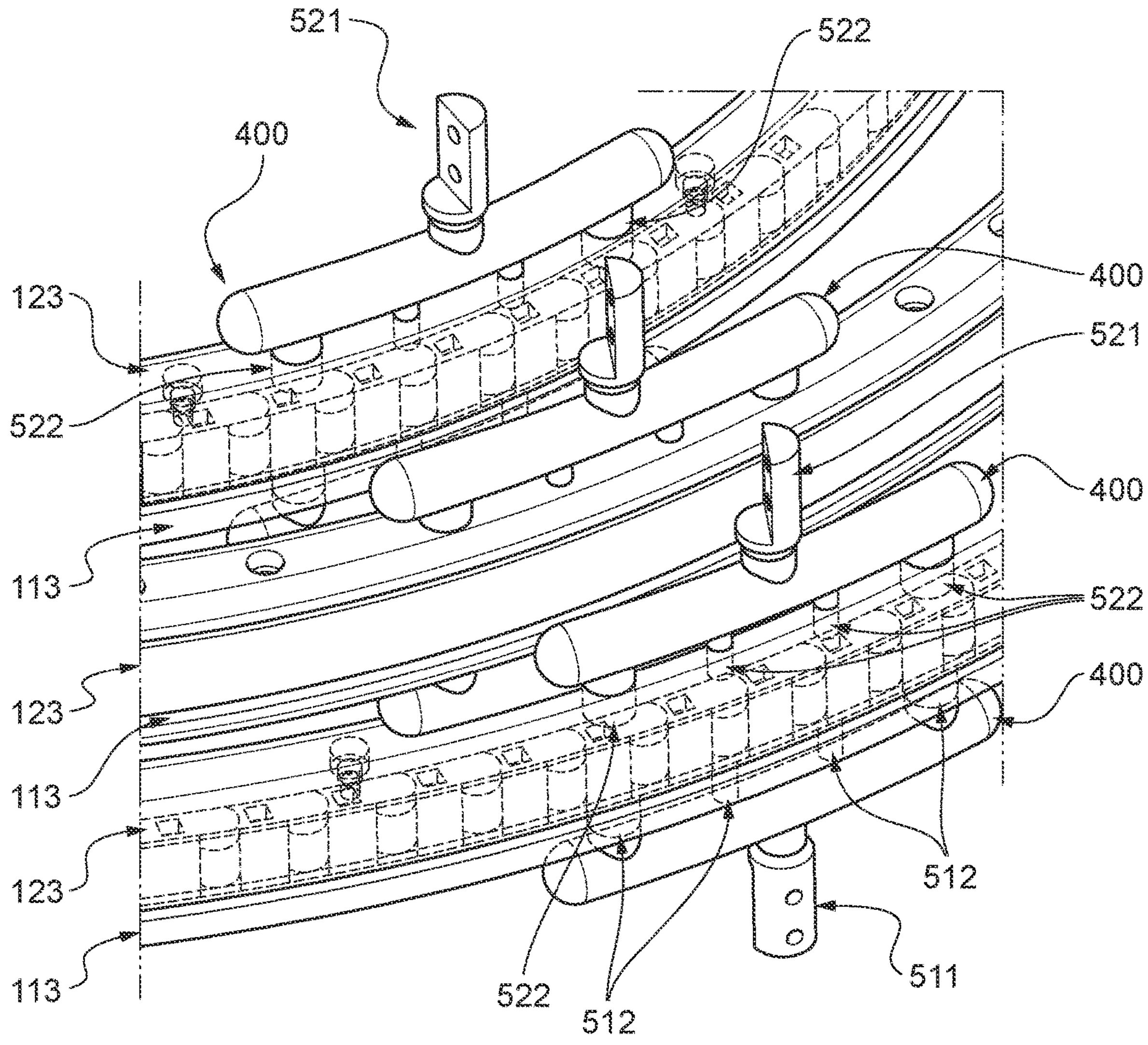
FIG. 7 shows schematically and partially in perspective a variant embodiment of the electrical rotary joint device.

FIG. 7 illustrates a variant embodiment that differs from the electrical rotary joint device described above simply in that the first electrical connectors and the second electrical connectors have a rake shape including a main body 400 housed in the closed internal chamber and from which there project, from a first side turned towards the first electrical track 113, and respectively towards the second electrical track 123, a plurality of secondary connection pins 512, 522 connected to the first electrical track 113, and respectively to the second electrical track 123, and from which a main connection pin 511, 521 projects on a second side opposite to the first side.

The main body 400 can have a general longitudinal curved shape to follow roughly the shape, here circular, of the electrical rotary joint device.

Variants that are not illustrated are presented below.

The electrical contact members can be formed by frustoconical portions rather than cylindrical.

The conductive elastic members can be formed by spring blades rather than spiral springs.

The conductive elastic members can be formed by conductive composite or elastomer pieces.

The conductive elastic members can be formed by an entanglement, for example random, of conductive wires.

The electrical interconnection mechanism can be devoid of any conductive elastic members.

The electrical tracks can have a U or I shape rather than an L shape, or take other forms.

The first part could be able to rotate with respect to the second part, which would be fixed, or the first and second parts are movable.

The installation rather allows electrical energy exploitation, for example in a wind-turbine field environment, or is configured to equip a concentrator of the hub type.

It is stated more generally that the invention is not limited to the examples described and shown.

The invention claimed is:

1. Electrical rotary joint device configured to equip an energy exploitation installation, including a first part having a least one first electrical connector and at least one first electrical track electrically connected to the first electrical connector, a second part having at least one second electrical connector and at least one second electrical track electrically connected to the second electrical connector, and an electrical interconnection mechanism configured to electrically interconnect the first electrical track and the second electrical track with the first part and the second part being movable with respect to each other and defining a closed internal chamber in which the first electrical track, the second electrical track and the electrical interconnection mechanism are housed; wherein the electrical interconnection mechanism includes a plurality of electrical contact members that are housed between the first electrical track and the second electrical track and are configured to form rolling deformable contacts between the first electrical track and the second electrical track, wherein the electrical contact members each have an internal face and an internal housing delimited by the internal face, and the electrical interconnection mechanism includes a plurality of conductive elastic members that are disposed in a respective internal housing and pressed against a respective internal face.

2. Device according to claim 1, wherein the conductive elastic members are formed by spiral springs.

3. Device according to claim 2, wherein the conductive elastic members have a contact face applied to the respective internal face of the electrical contact members.

4. Device according to claim 1, wherein the electrical contact members are formed by cylindrical or frustoconical tubular portions.

5. Device according to claim 1, wherein the electrical contact members are disposed at a distance from each other between and along the first electrical track and the second electrical track.

6. Device according to claim 1, wherein the electrical interconnection mechanism includes a support member on which the electrical contact members, able to rotate, are disposed.

7. Device according to claim 6, wherein the support member is in the form of a chain provided with links each including at least one electrical contact member.

8. Device according to claim 7, wherein the support member includes lower elements and upper elements disposed facing each other and mechanically connected, each of the lower elements overlapping at least one other of the lower elements and each of the upper elements overlapping at least one other of the upper elements, thus forming the links.

9. Device according to claim 8, wherein each link has, between the lower elements and the upper elements that overlap, at least one space receiving each electrical contact member.

10. Device according to claim 9, wherein each link has at least one spacing stud disposed between two successive reception spaces.

11. Device according to claim 6, wherein the links and the electrical contact members are arranged so that the electrical contact members project laterally from the links to provide the contact with the first electrical track and the second electrical track.

12. Device according to claim 1, wherein the first electrical track and the second electrical track have, in cross section, an L shape and are disposed in opposite orientations so as to form an internal space in which the electrical contact members are disposed.

13. Device according to claim 1, wherein the at least one first electrical connector, and respectively the at least one second electrical connector, have a rake shape including a main body from which there project, from a first side turned towards the first electrical track, and respectively towards the second electrical track, a plurality of secondary connection pins connected to the first electrical track, and respectively to the second electrical track, and from which a main connection pin projects on a second side opposite to the first side.

14. Energy exploitation installation, including at least one electrical rotary joint device according to claim 1, with the first part of the rotary joint device being attached to a fixed unit of the installation and the second part of the rotary joint device being fastened to a movable unit of the installation.

15. Electrical rotary joint device configured to equip an energy exploitation installation, including a first part having a least one first electrical connector and at least one first electrical track electrically connected to the first electrical connector, a second part having at least one second electrical connector and at least one second electrical track electrically connected to the second electrical connector, and an electrical interconnection mechanism configured to electrically interconnect the first electrical track and the second electrical track with the first part and the second part being movable with respect to each other and defining a closed internal chamber in which the first electrical track, the second electrical track and the electrical interconnection mechanism are housed; wherein the electrical interconnection mechanism includes a plurality of electrical contact members that are housed between the first electrical track and the second electrical track and are configured to form rolling deformable contacts between the first electrical track and the second electrical track, wherein the electrical interconnection mechanism includes a support member on which the electrical contact members, able to rotate, are disposed, wherein the support member is in the form of a chain provided with links each including at least one electrical contact member, and wherein the support member includes lower elements and upper elements disposed facing each other and mechanically connected, each of the lower elements overlapping at least one other of the lower elements and each of the upper elements overlapping at least one other of the upper elements, thus forming the links.

16. Energy exploitation installation, including at least one electrical rotary joint device according to claim 15, with the first part of the rotary joint device being attached to a fixed unit of the installation and the second part of the rotary joint device being fastened to a movable unit of the installation.

17. Electrical rotary joint device configured to equip an energy exploitation installation, including a first part having a least one first electrical connector and at least one first electrical track electrically connected to the first electrical connector, a second part having at least one second electrical connector and at least one second electrical track electrically connected to the second electrical connector, and an electrical interconnection mechanism configured to electrically interconnect the first electrical track and the second electrical track with the first part and the second part being movable with respect to each other and defining a closed internal chamber in which the first electrical track, the second electrical track and the electrical interconnection mechanism are housed; wherein the electrical interconnection mechanism includes a plurality of electrical contact members that are housed between the first electrical track and the second electrical track and are configured to form rolling deformable contacts between the first electrical track and the second electrical track, wherein the at least one first electrical connector, and respectively the at least one second electrical connector, have a rake shape including a main body from which there project, from a first side turned towards the first electrical track, and respectively towards the second electrical track, a plurality of secondary connection pins connected to the first electrical track, and respectively to the second electrical track, and from which a main connection pin projects on a second side opposite to the first side.

18. Energy exploitation installation, including at least one electrical rotary joint device according to claim 17, with the first part of the rotary joint device being attached to a fixed unit of the installation and the second part of the rotary joint device being fastened to a movable unit of the installation.

* * * * *